UNITED STATES PATENT OFFICE.

EMIL FISCHER, OF BERLIN, GERMANY, ASSIGNOR TO FARBENFABRIKEN VORM. FRIEDR. BAYER & CO., OF ELBERFELD, GERMANY, A CORPORATION OF GERMANY.

BROMIN DERIVATIVE OF FATTY ACIDS.

No. 850,111.     Specification of Letters Patent.     Patented April 9, 1907.

Original application filed June 23, 1906, Serial No. 323,037. Divided and this application filed December 5, 1906. Serial No. 346,461.

*To all whom it may concern:*

Be it known that I, EMIL FISCHER, professor of chemistry, a citizen of the German Empire, residing at Berlin, Kingdom of Prussia, have invented new and useful Improvements in Bromin Derivatives of Fatty Acids, of which the following is a specification.

The present application, which is a divisional application from my application, Serial No. 323,037, filed June 23, 1906, relates specifically to magnesium salts of the monobromin derivatives of high-molecular fatty acids and the production thereof.

I have found that the magnesium salts of monobromin-substituted high-molecular fatty acids—such as monobromobehenic acid, monobromostearic acid, or the like—possess valuable therapeutic properties. These salts, which are solid substances, have no taste and are valuable substitutes for potassium bromid, an average dose being from one to four grains.

My new preparations are obtained by converting the free monobromin-substituted high-molecular fatty acids or their alkaline salts into their magnesium salts. The monobromin-substituted high-molecular fatty acids are prepared by treating with hydrogen bromid the high-molecular acids of the oleic series, such as oleic acid, erucic acid, brassidic acid, elaidic acid, or the like.

The preparation of the magnesium salts of the bromin derivatives of the high-molecular fatty acids must be carried out in such a manner that the resulting salts are neutral, because salts containing free acid have a faint odor and taste. Under the terms "higher fatty acids" and "high-molecular fatty acids" those acids are generally understood which contain more than about twelve carbon atoms in their molecule.

The preparation of the magnesium salt of monobromobehenic acid, which is obtained by treating erucic acid with hydrogen bromid, is carried out as follows, the parts being by weight.

Example 1: Twenty-seven parts of crystallized magnesium chlorid containing water of crystallization and fifteen parts of ammonium chlorid are dissolved in fifty-five parts of hot water. The solution is saturated with gaseous ammonia, the precipitate thus obtained is filtered off, and the filtered solution is mixed with four hundred parts of methylic alcohol. To the liquid thus obtained a solution of forty parts of bromobehenic acid in four hundred parts of methylic alcohol is slowly added during stirring. The precipitated magnesium salt is filtered off, washed with methylic alcohol, water, and again with methylic alcohol, and dried *in vacuo*. It is a colorless and tasteless powder. It is formed according to the following equation:

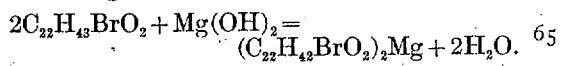

Example 2: The same salt results by the interaction of alkaline salts of bromobehenic acid with magnesium chlorid in the following manner: Monobromobehenic acid is dissolved in a somewhat larger quantity of caustic potash than is required by the acid by shaking it at ordinary temperature with highly-diluted caustic potash, (about 1/50 normal.) The calculated quantity of a dilute aqueous solution of chlorid of magnesium is added to the solution, and it is stirred until the flocculent colorless precipitate has settled. It is filtered off with suction, washed with water, then with alcohol to remove small quantities of free bromobehenic acid which may be present, and dried *in vacuo*. This purification is not necessary if an aqueous solution of chlorid of magnesium mixed with an excess of ammonia be used. The precipitated magnesium salt of bromobehenic acid is neutral and forms, after being washed with water and dried *in vacuo*, a white, tasteless, and odorless powder.

The preparation of other monobromin-substituted derivatives of high-molecular fatty acids and their salts of magnesium—*e. g.*, of monobromostearic acid—is carried out in an analogous manner. Brassidic acid, elaidic acid, oleic acid, &c., may be used.

Having now described my invention and in what manner the same is to be performed, what I claim as new, and desire to secure by Letters Patent, is—

1. The herein-described salts of magnesium of the monobromin-substituted derivatives of high-molecular fatty acids having the following general formula:

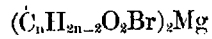

obtained from the corresponding high-molecular acids of the oleic series, which are solid, stable bodies, tasteless, colorless and insoluble in water, substantially as hereinbefore described.

2. The herein-described magnesium salt of monobromobehenic acid, $(C_{22}H_{42}BrO_2)_2Mg$, obtained from monobromobehenic acid, which is a solid, stable body, tasteless, colorless and insoluble in water, substantially as hereinbefore described.

In testimony whereof I have hereunto set my hand in the presence of two subscribing witnesses.

EMIL FISCHER.

Witnesses:
HENRY HASPER,
WOLDEMAR HAUPT.